United States Patent
Akhilesham et al.

(10) Patent No.: US 11,483,211 B2
(45) Date of Patent: Oct. 25, 2022

(54) INFRASTRUCTURE DISCOVERY AND ANALYSIS

(71) Applicant: INTERNATIONAL BUSINESS MACHINES CORPORATION, Armonk, NY (US)

(72) Inventors: Madhu Akhilesham, Pune (IN); Venkata Vara Prasad Karri, Visakhapatnam (IN); Akash U. Dhoot, Pune (IN); Niteen D Lakhe, Pune (IN); Shailendra Moyal, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/035,078

(22) Filed: Sep. 28, 2020

(65) Prior Publication Data

US 2022/0103433 A1 Mar. 31, 2022

(51) Int. Cl.
*H04L 41/147* (2022.01)
*H04L 41/082* (2022.01)
(Continued)

(52) U.S. Cl.
CPC .......... *H04L 41/147* (2013.01); *G06F 9/5072* (2013.01); *G06F 11/3457* (2013.01);
(Continued)

(58) Field of Classification Search
CPC ..... H04L 41/147; H04L 41/16; H04L 41/082; H04L 41/145; G06F 9/5072; G06F 11/3457; G06N 5/003
See application file for complete search history.

(56) References Cited

U.S. PATENT DOCUMENTS 11,050,677 B2 * 6/2021 Ghosh ................... H04L 47/762
2013/0091285 A1 4/2013 Devarakonda
(Continued)

OTHER PUBLICATIONS

Create a migration strategy for your application portfolio, https://d1.awsstatic.com/events/reinvent/2019 / REPEAT_2_Create_a_migration_strategy_for_your_application_portfolio_ENT301-R2.pdf.
(Continued)

*Primary Examiner* — John A Follansbee
*Assistant Examiner* — Fadi Haj Said
(74) *Attorney, Agent, or Firm* — Jorge R. Maranto

(57) ABSTRACT

A method, a computer program product, and a system for infrastructure discovery and service offering. The method includes discovering configuration information of components on an IT infrastructure of an enterprise. The method also includes discovering components, resources, and workload characteristics based on the configuration information. The method further includes analyzing the configuration information, components, resources, and workload characteristics to determine predictive need analytics and discovering applications operating within the IT infrastructure. The method also includes comparing the applications and predictive need analytics to cloud-based services to detect service compatibilities, and generating a decision-making chart based on the service compatibilities, wherein the decision-making chart indicates migratable components and applications in the IT infrastructure.

18 Claims, 5 Drawing Sheets

(51) Int. Cl.
*G06F 9/50* (2006.01)
*G06F 11/34* (2006.01)
*G06N 5/00* (2006.01)
*H04L 41/14* (2022.01)

(52) U.S. Cl.
CPC .......... *G06N 5/003* (2013.01); *H04L 41/082* (2013.01); *H04L 41/145* (2013.01)

(56) References Cited

U.S. PATENT DOCUMENTS

| | | | | |
|---|---|---|---|---|
| 2014/0282456 | A1* | 9/2014 | Drost | G06F 8/76 717/158 |
| 2017/0034016 | A1* | 2/2017 | Carroll | H04L 43/026 |
| 2017/0279692 | A1* | 9/2017 | Llagostera | H04L 41/5051 |
| 2019/0332572 | A1* | 10/2019 | Lerner | G06F 16/24564 |
| 2020/0004582 | A1 | 1/2020 | Fornash | |
| 2020/0244546 | A1* | 7/2020 | Tidemann | H04L 41/122 |
| 2021/0160191 | A1* | 5/2021 | Ghosh | H04L 47/788 |

OTHER PUBLICATIONS

Navigating cloud complexity: myNav brings clarity, Nov. 26, 2019, https://www.accenture.com/us-en/blogs/cloud-computing/kishore-durg-mynav-navigating-cloud-complexity.

SurPaaS® Assess™ Evaluates the Preparedness for Your Cloud Journey, https://www.corenttech.com/one-pager/SurPaaS_Assess_Product.html.

Systems and Method for IT Transformations, An IP.com Prior Art Database Technical Disclosure, IPCOM000260059D, Electronic Publication Date: Oct. 17, 2019, https://priorart.ip.com/IPCOM/000260059.

Website "Natural Language Processing Market by Component, Deployment Mode, Organization Size, Type, Application (Sentiment Analysis and Text Classification), Vertical (Healthcare and Life Sciences, and BFSI), and Region—Global Forecast to 2024," https://www.marketsandmarkets.com/Market-Reports/natural-language-processing-nlp-825.html.

Website, "Build apps with natural language processing," https://www.ibm.com/watson/natural-language-processing.

* cited by examiner

INFRASTRUCTURE DISCOVERY AND ANALYSIS

BACKGROUND

The present disclosure relates to infrastructure discovery, and more specifically, to discovering infrastructure components and determining service offerings based on the utilization of those components.

Information technology (IT) infrastructure can be defined as all of the hardware, software, networks, and facilities that are required to develop, test, deliver, monitor, control, or support IT services. The primary components of an IT infrastructure include, for example, physical components (e.g., computers, networking hardware, storage systems) and various software and network components.

Cloud computing is an on-demand availability of computer system resources, such as data storage and computing power, without the direct and active management by the user. Cloud service providers can offer various services according to different models and needs of a user. These services include, for example, infrastructure as a service (IaaS), platform as a service (PaaS), and software as a service (SaaS). IaaS typically refers to online services that provide high-level application programming interfaces (APIs) used to abstract various low-level details of underlying network infrastructure like physical computing resources. PaaS allows a user to deploy applications onto a cloud infrastructure using programming languages, libraries, and tools supported by the provider. SaaS provides users access to applications from various client devices through an interface such as a web browser.

SUMMARY

Embodiments of the present disclosure are directed to an infrastructure discovery system of infrastructure discovery and service offering, including at least one processor and at least one memory component. The system also includes a discovery engine configured to discover configuration information deployed in an IT infrastructure of an enterprise. The discovery engine is further configured to generate predictive need analytics based on the configuration information. The system further includes a cloud services engine configured to retrieve cloud-based service offerings from cloud service providers compatible with the configuration information. The cloud service engine is further configured to discover application operating on the IT infrastructure and to generate a matrix guide relating to the compatibility of the applications and components on a cloud-based service. The system also includes a decision engine configured to generate a decision-making chart based on the insights, configuration information, and the cloud-based service offerings, the decision-making chart providing a migration path for the IT infrastructure.

Additional embodiments are directed to a computer-implemented method of infrastructure discovery and service offerings. The computer-implemented method includes discovering configuration information of components on an IT infrastructure of an enterprise including the workload of the components. The computer-implemented method also includes discovering the components, resources, and workload characteristics based on the configuration information. The computer-implemented method further includes analyzing the configuration information, the resources, and workload characteristics to determine predictive need analytics for each of the components and discovering applications operating within the IT infrastructure. The computer-implemented method also includes comparing the applications and predictive need analytics to cloud-based services to detect service compatibilities and generating a decision-making chart based on the service compatibilities, wherein the decision-making chart indicates the components and the applications that are migratable to the cloud-based services.

Further embodiments are directed to a computer program product of infrastructure discovery and service offerings, which can include a computer-readable storage medium having program instruction embodied therewith, the program instruction executable by a processor to cause the processor to perform a method. The method includes discovering configuration information of components on an IT infrastructure of an enterprise including the workload of the components. The method also includes discovering the components, resources, and workload characteristics based on the configuration information. The method further includes analyzing the configuration information, the resources, and workload characteristics to determine predictive need analytics for each of the components and discovering applications operating within the IT infrastructure. The method also includes comparing the applications and predictive need analytics to cloud-based services to detect service compatibilities and generating a decision-making chart based on the service compatibilities, wherein the decision-making chart indicates the components and the applications that are migratable to the cloud-based services.

BRIEF DESCRIPTION OF THE DRAWINGS

These and other features, aspects, and advantages of the embodiments of the disclosure will become better understood with regard to the following description, appended claims, and accompanying drawings where:

Figure 1:
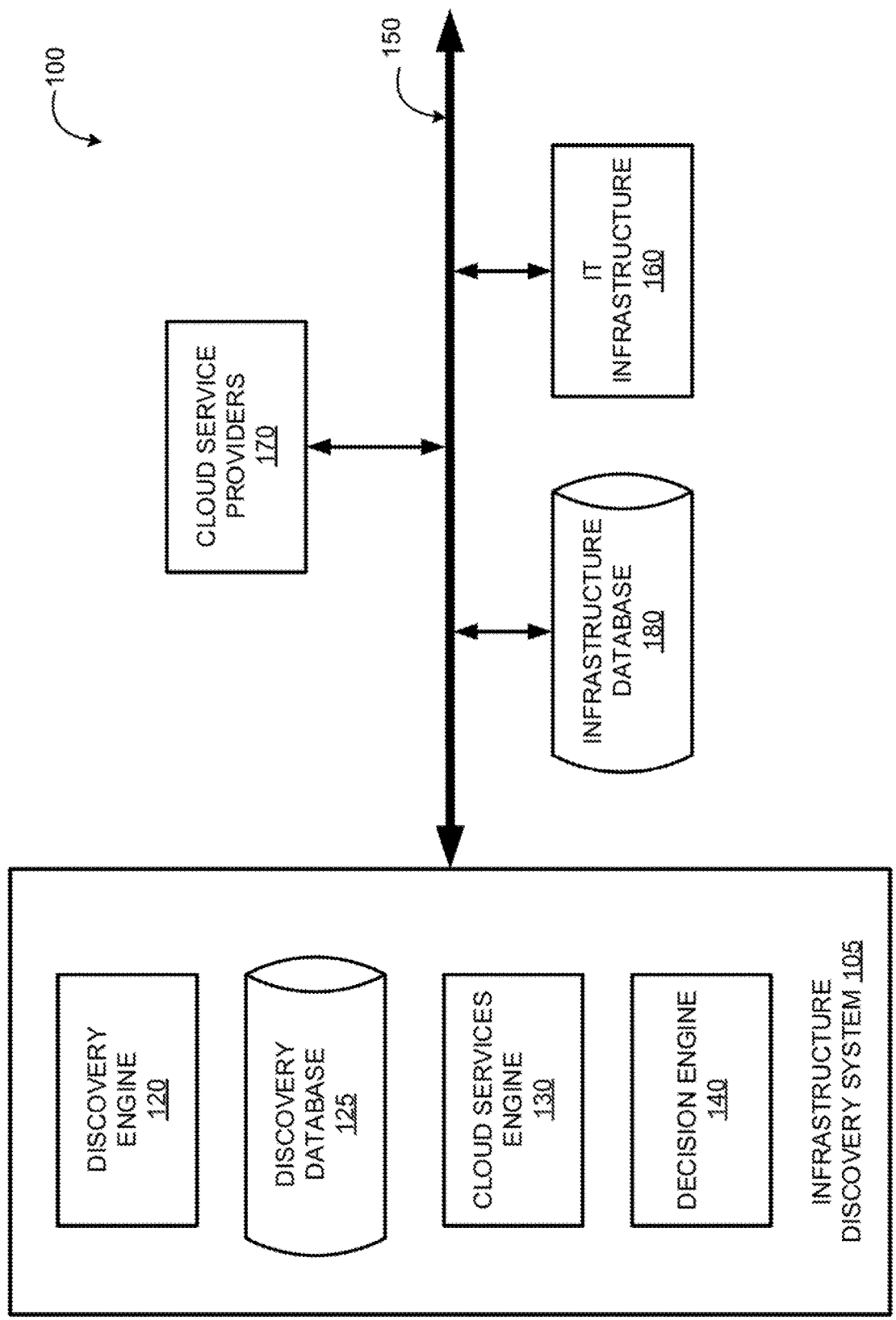
FIG. 1 is a block diagram illustrating an infrastructure discovery system in a computing environment, in accordance with embodiments of the present disclosure.

While the present disclosure is amenable to various modifications and alternative forms, specifics thereof have been shown by way of example, in the drawings and will be described in detail. It should be understood, however, that the intention is not to limit the particular embodiments described. On the contrary, the intention is to cover all modifications, equivalents, and alternatives falling within the scope of the present disclosure. Like reference numerals are used to designate like parts in the accompanying drawings.

DETAILED DESCRIPTION

The present disclosure relates to infrastructure discovery, and more specifically, to discovering configuration information of components within an IT infrastructure and determining service offerings based on the utilization of those components. While the present disclosure is not necessarily limited to such applications, various aspects of the disclosure may be appreciated through a discussion of various examples using this context.

The hardware, software, and network utilization of monolithic IT infrastructures for some enterprises is difficult to encapsulate and understand. These IT infrastructures are increasingly moving toward a combination of on-premise and cloud-based infrastructures. Migrating some or all parts of an IT infrastructure onto a cloud-based infrastructure typically requires IT administrators to rewrite or customize the code enterprise network applications such as email service, web service, databases, data files, virtual desktop infrastructure, and enterprise resource planning into services provided by a cloud provider. As a result, some migrations can become unproductive and costly endeavors due to time-consuming post reconfigurations, failures in achieving original workload performances, or unnecessary overprovisioning of resources.

In some instances, an enterprise may want to take a "lift and shift" approach, where the enterprise makes minimal or no changes to the code and configuration of its IT infrastructure. Administrators may also lift storage requirements of on-premises IT infrastructure and shift or replicate the storage requirements to a cloud-based infrastructure. However, this may result in an over-estimation or under-estimation of required cloud resources.

An "end-to-end" migration process of an IT infrastructure to cloud-based services (e.g., IaaS, PaaS, SaaS) can be a challenging undertaking consisting of several critical steps and potentially span across multiple organizations. "Lift and Shift" or "Re-hosting" migrations to cloud-based services are inherently risky due to unknown variables that may be fundamental to an IT infrastructure. In "lift and shift" migrations, an enterprise may utilize applications in the cloud that are effectively a clone of the existing data center implementation. In the "re-hosting" migration, the application may be similar to the existing enterprise implementation, but individual services may be replaced with cloud-native services.

Commonly, enterprises may migrate their existing IT infrastructure to the cloud by replicating the existing on-premise configurations with cloud-based configurations. However, these approaches can prove to be unproductive and costly due to time-consuming post reconfigurations, failure to achieve the original workload performance or unnecessary overprovisioning of resources.

Another approach is to right-size the on-premise configurations before migration. While this approach improves upon the replication approach, it still may not lead directly to a correct cloud configuration. Cloud service providers offer an array of configurations and use highly scalable and customizable hypervisors. Thus, computational performance can vary significantly between on-premise IT infrastructure and cloud-based infrastructure.

In the absence of workload simulation, workload performance can only be verified by moving the actual application or infrastructure to the cloud with no guarantee that the cloud service provider can support the resource demands of the workloads and deliver acceptable performance. Even if cloud configuration adjustments are made to the original workloads after the migration, the operating cost may be significantly higher than budgeted, which could lead to the repatriation of the IT infrastructure.

Embodiments of the present disclosure may overcome the above and other problems by using an infrastructure discovery system. The infrastructure discovery system can be deployed to allow for the discovery of configuration information such as enabled infrastructure, applications, and resource utilization in operation by an enterprise. Additionally, the configuration information can be analyzed and assessed to provide a cost and technical viability assessment through predictive need analytics. The viability assessment can provide the enterprise with an insight as to which infrastructure components can be migrated to cloud-based services.

More specifically, the infrastructure discovery system collects metrics and information from an IT infrastructure, such as an enterprise's monolithic infrastructure, to run artificial intelligence analysis that analyzes the needs of the IT infrastructure in conjunction with the cloud-based service offerings to provide a user with viable migration options.

By way of example, but not by limitation, a banking corporation utilizes a legacy offering. The infrastructure discovery system is deployed to analyze the infrastructure of the banking corporation. After analysis, high traffic is identified on a "Fund Transfer" page during business hours. The infrastructure discovery system analysis can determine a peak data transfer rate for that service and use that information to run a simulation on a target cloud service to see if the new architecture can handle the load. Metrics are generated as to whether the "Fund Transfer" banking service can be migrated or not. This process can be repeated for each infrastructure component in the IT infrastructure.

Embodiments of the present disclosure include a discovery engine records configuration information of an IT infrastructure and presents the activity in an auditable format. For example, the configuration information includes infrastructure components, software utilization, network traffic, and the like. The configuration information can be analyzed for catalog matches across multiple application sets and possible reconciliation exceptions. The discovery engine can then present actionable "to do" lists to resolve possible issues found in the activity.

Embodiments of the present disclosure include a cloud services engine configured to discover various applications operating across various servers and network devices within the IT infrastructure and map the dependencies between the applications. In some embodiments, the cloud services engine retrieves available service offerings from cloud service providers that are relevant to the components identified by the discovery engine and develop a matrix guide matching the available services to the components.

Embodiments of the present disclosure include an insight metric decision engine configured to compile the information produced and gathered by the discovery engine and the cloud services engine to generate a decision-making chart that can recommend a migration path for each of the components in the IT infrastructure.

Referring now to figures, FIG. 1 is a block diagram illustrating a computing environment 100, in accordance with embodiments of the present disclosure. The computing environment 100 includes an infrastructure discovery system 105, a network 150, IT infrastructure 160, cloud service providers 170, and an infrastructure database 180. The infrastructure discovery system 105 includes a discovery engine 120, a discovery database 125, a cloud services engine 130, and a decision engine 140.

The discovery engine 120 is a component of the infrastructure discovery system 105 configured to analyze and discover configuration information, events, and workloads of components on an IT infrastructure. The workloads include workload characteristics such as peak processor utilization, peak memory utilization, on-premise storage capacity, network throughput, and usage patterns. The workloads can be short-term loads as well as long-term loads. The discovery engine 120 further configured to discover the relationships that exist between the hardware, software, and related information in the IT infrastructure. As part of the discovery process, the discovery engine 120 captures open port and listening process information. Once all of the various components have been discovered, the discovery engine 120 can apply a heuristic-based process to determine the implied relationships between the components. For example, a Web server might be communicating through a specific host port, and an application server might be listening to that port on that host. The discovery engine 120 can leverage the implied relationship to build a complete dependencies graph.

The discovery engine 120 is further configured to perform a reconciliation analysis between the discovered components. The reconciliation analysis can aggregate the identifiers used by the components and reconciles possible duplicated information. Multiple products can manage various portions of the IT infrastructure 160, with each product collecting data about the components for which that product is responsible for. Products from these vendors often store their collected data in various ways. The information in each product data store might reference the same component in the IT infrastructure 160, but it may have different information captured as part of the processing. For example, a licensing software application might identify a computer system in the IT infrastructure by collecting the manufacturer, model, and serial number. However, another product used for asset management might identify the computer using the Media Access Control (MAC) address of the network interface card (NIC). If this data is collected by the discovery engine 120, then there can potentially be redundancy in the identified components.

In some embodiments, the discovery engine 120 performs a reconciliation analysis that assigns the naming rules table to each component. When information is collected, the discovery engine 120 fills out the naming rules table that identifies components. The naming rules tables for each component can be cross-referenced to eliminate duplicate tables.

In some embodiments, the discovery engine 120 monitors the IT infrastructure to provide the metrics generated by the components and applications within the IT infrastructure. The monitoring can include checking application performance against business expectations. Performance data, such as processor, memory, and storage performance, can be collected and analyzed for abnormalities and faults. If a fault is detected, the discovery engine 120 can provide an alert annotated with a context that can include an escalation request and/or automatic responses based on the fault.

Monitoring can also cover metrics, logging, tracing, alerting, visualization, and the like. Monitoring metrics can expose certain system resources, application actions, or business characteristics as specific points in a time value. This information can be obtained in an aggregated form. For example, a metric can reveal how many requests per second were served on a component. Logging can manifest as an event from a system or application, and contain all the information that is produced by such an event. Tracing tracks a request with a unique identifier that can be tracked during its life cycle across the IT infrastructure. Alerting can be a continuous threshold validation of metrics or logs, with the alert being an action or notification in the case of a threshold being achieved by some action or transgression.

In some embodiments, the discovery engine 120 operates as a service on the IT infrastructure to discover the contents of the IT infrastructure. The discovery engine 120 can utilize discover sensors. Each discover sensor can have an input object called a seed, then a discover step, and an output called a result. The discovery can start by providing a set of initial seeds. The initials seeds can represent an IP address or a range of IP addresses to discover. The initial seeds provide a starting point for the discovery engine 120, which triggers the initial sensors. The sensors can probe the IT infrastructure and discover configuration information and dependency relationship information. The configuration information can map into model objects that can get saved into the discovery database 125.

The discovery engine 120 may further include machine learning techniques that infrastructure discovery system 105 may use to analyze the configuration information gathered on the IT infrastructure and produce predictive need analytics. For example, increases in downloaded data, uploaded data, transactions, and users can additionally be analyzed along with the configuration information. Based on the information, the machine learning model can generate a predictive need analytic that predicts the upcoming potential need for IT infrastructure growth on a company-based level. For example, the predictive need analytics can indicate the type of infrastructure required by a company in the foreseeable future. Based on that need, the infrastructure discovery system 105 can determine which cloud service offering would be an optimal choice, not only in the current state of the IT infrastructure but also for a company's ever-changing future need.

Machine learning techniques can comprise algorithms or models that are generated by performing supervised, unsupervised, or semi-supervised training on a dataset, and subsequently applying the generated algorithm or model to generate infrastructure needs metrics according to return on investment, areas of improvement, workload management, and cost reduction. Machine learning algorithms can include but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, the machine learning algorithms can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), classification and regression tree (CART), chi-squared automatic interaction detection (CHAID), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

The discovery database 125 is a component of the discovery system 105 configured to store information relating to the IT infrastructure. The discovery database 125 can store information collected, gathered, and generated by the discovery engine 120, the cloud services engine 130, and the decision engine 140. In some embodiments, the configuration information data relating to the IT infrastructure is imported into the discovery database 125 via another system, API, or DLA. While shown in FIG. 1 as a database, the discovery database 125 can be a mapping, a table, journal, metadata, and the like.

The cloud services engine 130 is a component of the discovery system 105 configured to retrieve cloud service offerings from the cloud service providers 170 and to discover application information from the IT infrastructure 160. The cloud services engine 130 can discover various applications running on various server and network devices within the IT infrastructure 160, and map the dependencies between those applications.

In some embodiments, the cloud services engine 130 utilizes sensors to discover applications and their dependencies. When the sensor is launched, it can utilize three techniques to collect operating system and application information from the IT infrastructure. These techniques include host scanning rule-based operating system (OS) fingerprinting to determine the type of OS, use of open source tools to gather the OS information, and use of Remote Execution and Access (RXA) to determine OS information. Once the OS is determined, the sensor can proceed to perform an application discovery, and the discovered results can be written to the discovery database 125.

The cloud services engine 130 is further configured to identify relationships between the applications discovered. Relationships specify the connection among various entities and provide meaning to the type of information that is stored at each entity. The relationships can provide context between the configuration information and the applications within the IT infrastructure. The cloud services engine 130 can examine the configuration of each component discovered by the discovery engine 120, and determine the ports that are assigned to the applications. The cloud services engine 130 can use this information to determine the relationships and the dependencies between applications and other discovered components.

The cloud services engine 130 is further configured to assess the discovered applications and the retrieved service offerings from the cloud service providers. The assessment can determine which offerings offer relatively the same, or similar, set of service as the discovered applications. The cloud services engine 130 can generate a matrix guide indicating which discovered application could be moved to a cloud service offering. For example, using container services for Java-based applications, recommending an open-source stack based on application usage and security parameters, using a third-party platform in place of an existing application, and the like. In some embodiments, the matrix guide includes configuration information, such as the components associated with a particular application. This can assist an administrator in determining whether or not migration is a viable option.

The decision engine 140 is a component of the infrastructure discovery system 105 configured to analyze the information collected, analyzed and generated by the discovery engine 120 and the cloud services engine 130 to generate a decision-making chart. The decision-making chart can detail an operational plan encompassing the benefits of migration for the specific business, or enterprise, operating the IT infrastructure 160. The decision-making chart can include information produced by the matrix guide as well as the analysis performed by the machine learning model to provide a recommendation on migrating the IT infrastructure 160 to a cloud-based service offering. Additionally, the decision-making chart includes points and insights as to why an application should or should not remain on existing infrastructure, as well as a detailed proposal of how to implement a migration. Using this information, a business can determine an optimal course of action in migrating components of the infrastructure to the correct cloud service provider 170.

The decision engine 140 is further configured to detail the necessary improvements required based on the configuration information, the existing components, the workload, and the application operating within the IT infrastructure. The improvements can encompass the process or technology needed to take full advantage of IT infrastructure.

In some embodiments, the decision-making chart includes software consumption metrics of the applications discovered by the cloud services engine 130. The software consumption metrics can indicate a need for improvement of the existing IT infrastructure. This additional information allows end users to visualize various issues regarding the relationship between the infrastructure and the software. These issues include, but are not limited to, elasticity, data flows, database challenges, user interface challenges, load balancer issues, security concerns, governance issues associated in data transfers from a monolithic infrastructure to microservices based applications. Additionally, the software consumption metrics can be used to send categorical communication alerts to administrators regarding possible tools that can be acquired to alleviate possible consumption issues. For example, a Web server may need faster computational speed to handle the peak workload. This can guide an enterprise, or business, into deciding whether to migrate a component or improve upon the existing IT infrastructure. An estimate into the cost and schedule of future projects can also be included to assist in the determination.

The network 150 is a component of the computing environment 100 configured to communicatively couple the infrastructure discovery system 105 to the IT infrastructure 160 and to the cloud service provider 170. Embodiments of the network 150 include a local-area network, wireless network, the Internet, public switch telephone network, a radio access network, and other networks. The other networks include wired or wireless communication networks owned and/or operated by network service providers.

The IT infrastructure 160 is a component of the computing environment 100 that encompasses an infrastructure of an enterprise or business. The IT infrastructure 160 includes on-premise infrastructure, containerized infrastructure, and cloud-based infrastructure. For example, the IT infrastructure 160 includes data centers, web servers, databases, containerized data centers, on-premise data centers, storage systems, and the like, that are used by an enterprise or business.

The cloud service providers 170 are third-party companies offering cloud-based platforms, infrastructure, applications, or storage devices within the computing environment 100. The cloud service providers 170 can provide a pay-per-use model as well as options, such as scalability, redundancy, customization, and load balancing.

The infrastructure database 180 is a component of the computing environment 100 configured to store information relating to the IT infrastructure. The infrastructure database 180 can store information collected, gathered, and generated by the discovery engine 120, the cloud services engine 130, and the decision engine 140 remotely. In some embodiments, the configuration information data relating to the IT infrastructure is imported into the infrastructure database 180 via another system, API, or DLA. While shown in FIG. 1 as a database, the infrastructure database 180 can be a mapping, a table, journal, metadata, and the like.

It is noted that FIG. 1 is intended to depict the major representative components of an exemplary computing environment 100. In some embodiments, however, individual components may have greater or less complexity than as represented in FIG. 1, components other than or in addition to those shown in FIG. 1 may be present, and the number, type, and configuration of such components may vary.

In some embodiments, the infrastructure discovery system 105 is implemented, at least in part, internal to the IT infrastructure 160. The infrastructure discovery system 105 may be implemented, at least in part, using one or more processing platforms, including public or private cloud infrastructures, or other distributed virtual infrastructures. These distributed virtual infrastructures include, for example, a hypervisor platform and associated virtual processing and storage elements.

Figure 2:
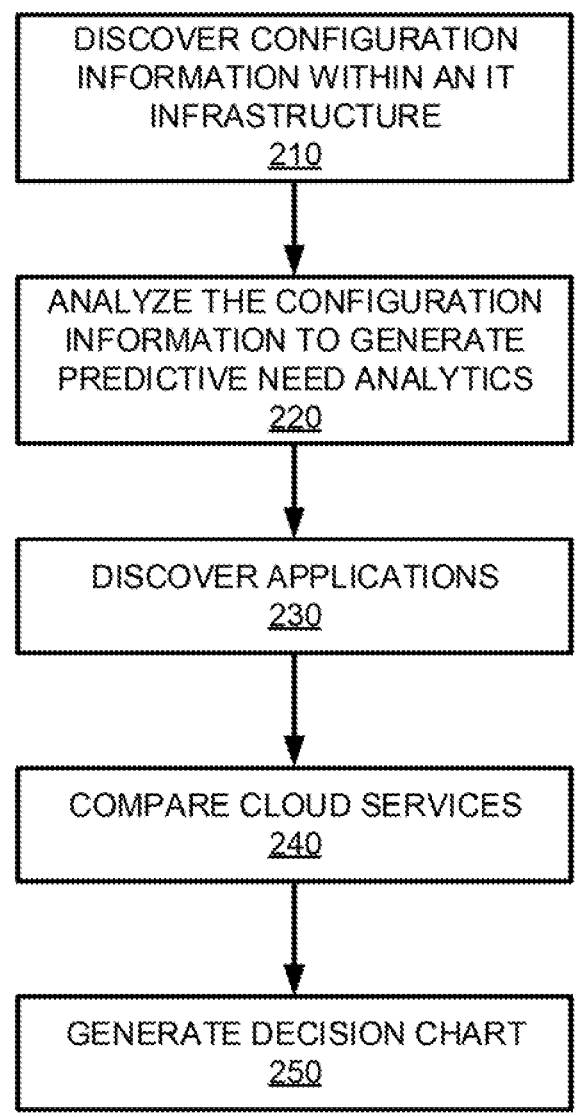
FIG. 2 is a flow diagram illustrating an infrastructure discovery process, in accordance with embodiments of the present disclosure.

FIG. 2 is a flow diagram illustrating a process 200 of infrastructure discovery and analysis, in accordance with embodiments of the present disclosure. The process 200 can be implemented by, for example, one or more entities in the computing environment 100, a computer system 400, a processor, or another configuration of hardware and/or software.

The process 200 begins by the discovery engine 120 discovering configuration information of components on an IT infrastructure. This is illustrated at step 210. The discovery engine 120 can also discover events, activities, and workloads of the components in the IT infrastructure. In some embodiments, the discovery engine 120 determines the implied relationships between the components based on the discovered configuration information.

Additionally, the discovery engine 120 can perform a reconciliation analysis to analyze the configuration information on the IT infrastructure and catalog transactional matches between application sets and to notate the reconciliation exceptions between the components. In some embodiments, the reconciliation analysis is performed using a naming rules table that identifies the components based on various naming conventions used to identify the components. These naming conventions include, for example, an IP address, manufacturer model number, MAC address, serial number, and the like.

In some embodiments, the discovery engine 120 uses discover sensors to discover the configuration information of the components. The sensors can probe the IT infrastructure and discover configuration information and dependency relationship information. The configuration information can map into model objects that can get saved into the discovery database 125. In some embodiments, the configuration information, the components, workloads, and other information is provided by other systems and retrieved by the discovery engine 120.

The discovery engine 120 analyzes the configuration information and the components to determine predictive need analytics for each of the components. This is illustrated at step 220. In some embodiments, the discovery engine 120 uses a machine learning model to generate the predictive need analytics. The various information obtained about the IT infrastructure, such as the configuration information, workload, components, and the like, can be inputted into the machine learning model to produce the predictive need analytics. The predictive need analytics can predict the upcoming potential need for IT infrastructure growth on a company-based level.

The cloud services engine 130 discovers applications operating on the components of the IT infrastructure. This is illustrated at step 230. In some embodiments, the cloud services engine 130 uses sensors to discover applications and their dependencies. When the sensor is launched, it can utilize three techniques to collect application information from the IT infrastructure. These techniques include host scanning rule-based OS fingerprinting to determine the type of OS, use of open source tools to gather the OS information, and use of RXA to determine OS information and application information.

In some embodiments, the cloud services engines 130 identifies relationships between the applications discovered. The relationships can provide context between the configuration information and the applications within the IT infrastructure. The cloud services engine 130 can examine the configuration of each component discovered by the discovery engine 120, and determine the ports that are assigned to the applications.

The cloud services engine 130 compares the applications to cloud-service offerings retrieved and offered by cloud service providers. This is illustrated at step 240. The comparison can be an assessment to determine which offerings offer relatively the same or similar set of services as the discovered applications. In some embodiments, the comparison detects the cloud-based services that are compatible with the application, and the predictive needs analytics. For example, an alternative cloud-based application may be used in place of the current application, or the application may be run within a container. Additionally, the predictive need analytics can provide insight as to the workload of the application and how many resources may be needed to operate the application under certain workloads.

In some embodiments, the cloud services engine 130 can simulate the application workload on the cloud-based services to determine which services can handle the workload. The predictive need analytics can also provide insight into potential workload growth, which can also be simulated. Using that information, cloud services engine 130 can simulate the components and the applications under peak utilization on the cloud-based services. Once the simulation is complete, the cloud services engine 130 can disregard the cloud-based services incapable of operating the components and applications under the peak utilization. The remaining cloud-based services can be ranked based on their performance during the simulation. The ranking can factor in performance, cost, availability, and ease of migration.

In some embodiments, the cloud services engine 130 generates a matrix guide indicating which discovered application could be moved to a cloud service offering. For example, using container services for Java-based applications, recommending an open-source stack based on application usage and security parameters, using a third-party platform in place of an existing application, and the like. In some embodiments, the matrix guide includes configuration information, such as the components associated with a particular application.

The decision engine 140 generates a decision-making chart based on the information collected, analyzed and generated by the discovery engine 120 and the cloud services engine 130. This is illustrated at step 250. The decision-making chart can detail an operational plan encompassing the benefits of migration for the specific business, or enterprise, operating the IT infrastructure 160. The decision-making chart can include information produced by the matrix guide as well as the predictive need analytics performed by the machine learning model to provide a recommendation on migrating the IT infrastructure to a cloud-based service offering.

Figure 3:
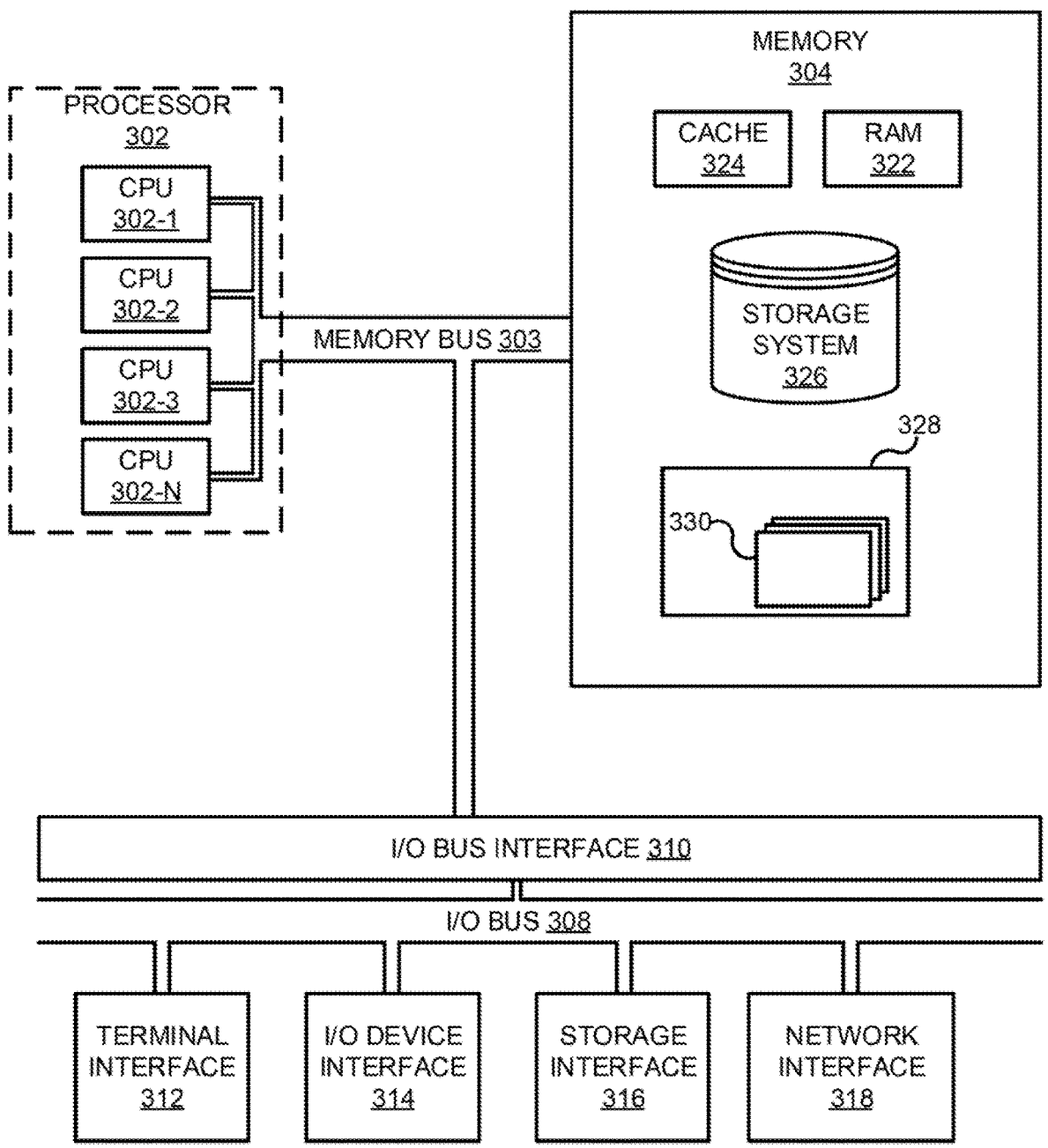
FIG. 3 is a high-level block diagram illustrating an example computer system that may be used in implementing one or more of the methods, tools, and modules, and any related functions, described herein, in accordance with embodiments of the present disclosure.

Referring now to FIG. 3, shown is a high-level block diagram of an example computer system 300 (e.g., the infrastructure discovery system 105) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 300 may comprise one or more processors 302, a memory 304, a terminal interface 312, an I/O (Input/Output) device interface 314, a storage interface 316, and a network interface 318, all of which may be communicatively coupled, directly or indirectly, for inter-component communication via a memory bus 303, an I/O bus 308, and an I/O bus interface 310.

The computer system 300 may contain one or more general-purpose programmable central processing units (CPUs) 302-1, 302-2, 302-3, and 302-N, herein generically referred to as the processor 302. In some embodiments, the computer system 300 may contain multiple processors typical of a relatively large system; however, in other embodiments, the computer system 300 may alternatively be a single CPU system. Each processor 301 may execute instructions stored in the memory 304 and may include one or more levels of on-board cache.

The memory 304 may include computer system readable media in the form of volatile memory, such as random-access memory (RAM) 322 or cache memory 324. Computer system 300 may further include other removable/non-removable, volatile/non-volatile computer system storage media. By way of example only, storage system 326 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, the memory 304 can include flash memory, e.g., a flash memory stick drive or a flash drive. Memory devices can be connected to memory bus 303 by one or more data media interfaces. The memory 304 may include at least one program product having a set (e.g., at least one) of program modules that are configured to carry out the functions of various embodiments.

Although the memory bus 303 is shown in FIG. 3 as a single bus structure providing a direct communication path among the processors 302, the memory 304, and the I/O bus interface 310, the memory bus 303 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 310 and the I/O bus 308 are shown as single respective units, the computer system 300 may, in some embodiments, contain multiple I/O bus interface units, multiple I/O buses, or both. Further, while multiple I/O interface units are shown, which separate the I/O bus 308 from various communications paths running to the various I/O devices, in other embodiments some or all of the I/O devices may be connected directly to one or more system I/O buses.

In some embodiments, the computer system 300 may be a multi-user mainframe computer system, a single-user system, or a server computer or similar device that has little or no direct user interface but receives requests from other computer systems (clients). Further, in some embodiments, the computer system 300 may be implemented as a desktop computer, portable computer, laptop or notebook computer, tablet computer, pocket computer, telephone, smartphone, network switches or routers, or any other appropriate type of electronic device.

It is noted that FIG. 3 is intended to depict the major representative components of an exemplary computer system 300. In some embodiments, however, individual components may have greater or lesser complexity than as represented in FIG. 3, components other than or in addition to those shown in FIG. 3 may be present, and the number, type, and configuration of such components may vary.

One or more programs/utilities 328, each having at least one set of program modules 330 (e.g., the infrastructure discovery system 105), may be stored in memory 304. The programs/utilities 328 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 328 and/or program modules 330 generally perform the functions or methodologies of various embodiments.

It is to be understood that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure that includes a network of interconnected nodes.

Figure 4:
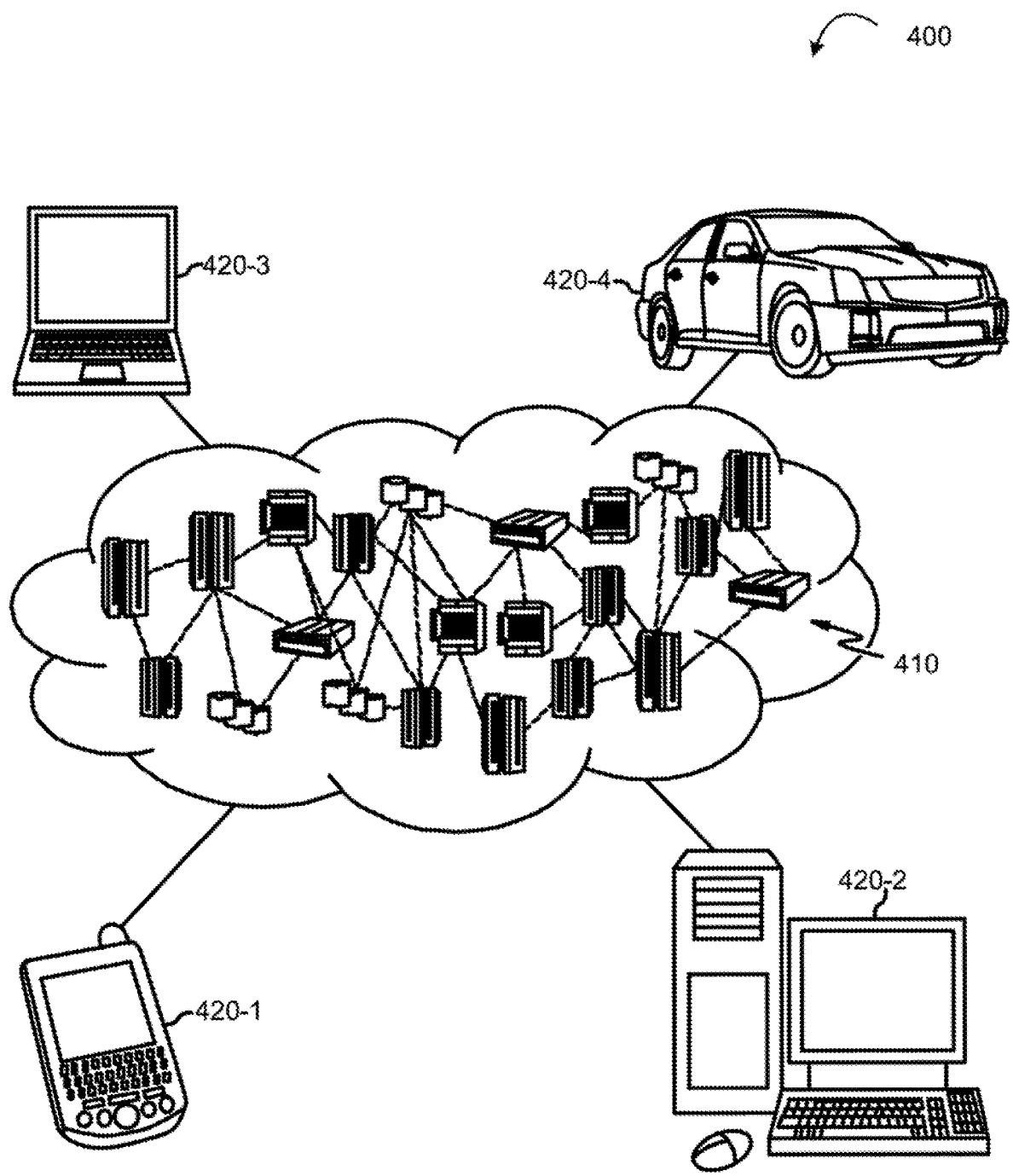
FIG. 4 depicts a cloud computing environment, in accordance with embodiments of the present disclosure.

Referring now to FIG. 4, illustrative cloud computing environment 400 is depicted. As shown, cloud computing environment 400 includes one or more cloud computing nodes 410 with which local computing devices used by cloud consumers, such as, for example, personal digital assistant (P.D.A.) or cellular telephone 420-1, desktop computer 420-2, laptop computer 420-3, and/or automobile computer system 420-4 may communicate. Nodes 410 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 420-1 to 420-4 shown in FIG. 4 are intended to be illustrative only and that computing nodes 410 and cloud computing environment 400 can communicate with any type of computerized device over any type of network and/or network addressable connection (e.g., using a web browser).

Figure 5:
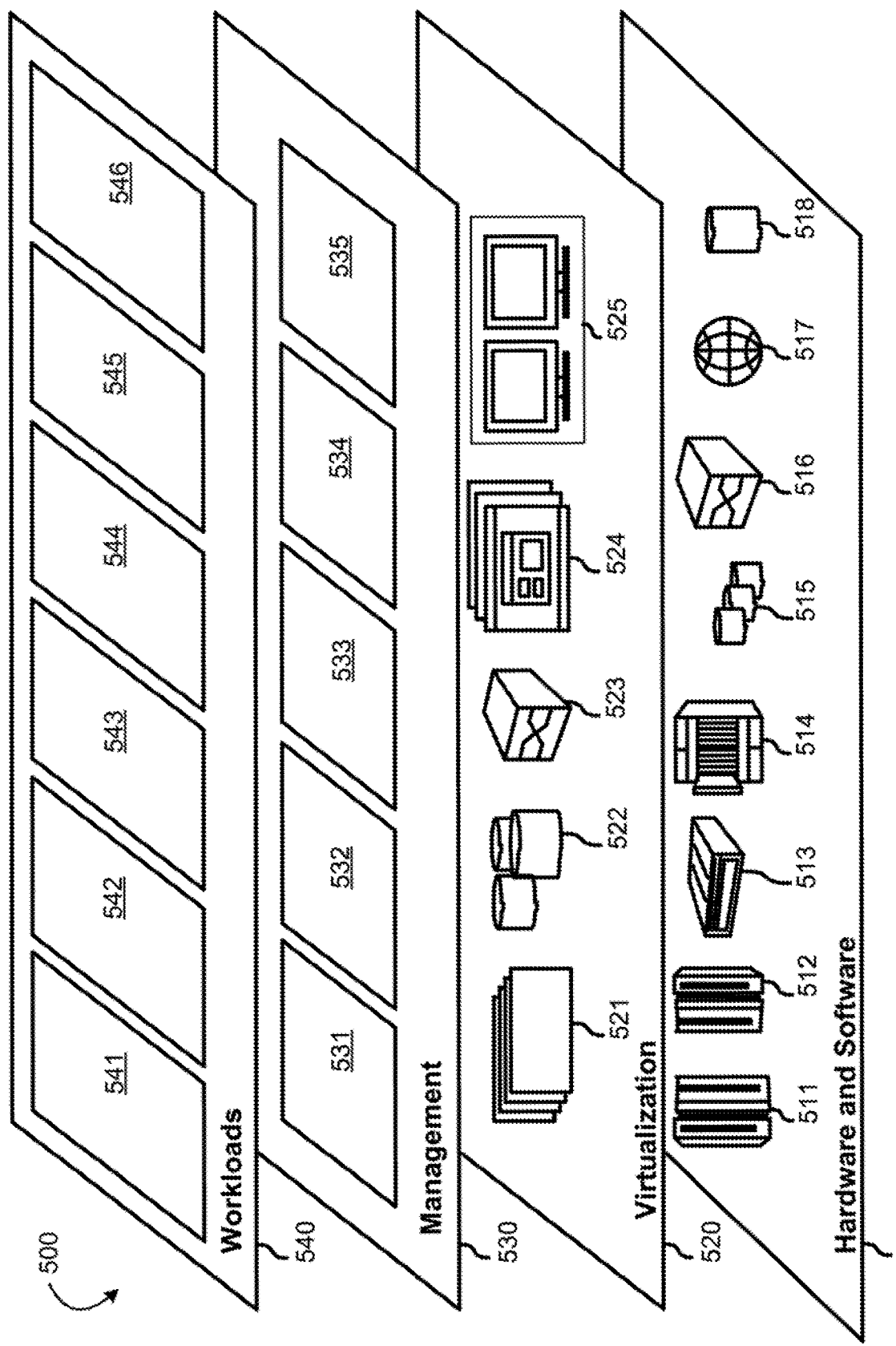
FIG. 5 depicts abstraction model layers, in accordance with embodiments of the present disclosure.

Referring now to FIG. 5, a set of functional abstraction layers 500 provided by cloud computing environment 400 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 510 includes hardware and software components. Examples of hardware components include mainframes 511; RISC (Reduced Instruction Set Computer) architecture-based servers 512; servers 513; blade servers 514; storage devices 515; and networks and networking components 516. In some embodiments, software components include network application server software 517 and database software 518.

Virtualization layer 520 provides an abstraction layer from which the following examples of virtual entities may be provided: virtual servers 521; virtual storage 522; virtual networks 523, including virtual private networks; virtual applications and operating systems 524; and virtual clients 525.

In one example, management layer 530 may provide the functions described below. Resource provisioning 531 provides dynamic procurement of computing resources and other resources that are utilized to perform tasks within the cloud computing environment. Metering and Pricing 532 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 533 provides access to the cloud computing environment for consumers and system administrators. Service level management 534 provides cloud computing resource allocation and management such that required service levels are met. Service Level Agreement (SLA) planning and fulfillment 535 provide pre-arrangement for, and procurement of, cloud computing resources for which a future requirement is anticipated in accordance with an SLA.

Workloads layer 540 provides examples of functionality for which the cloud computing environment may be utilized. Examples of workloads and functions which may be provided from this layer include mapping and navigation 541; software development and lifecycle management 1342 (e.g., the infrastructure discovery system 105); virtual classroom education delivery 543; data analytics processing 544; transaction processing 545; and infrastructure discovery 546.

The present invention may be a system, a method, and/or a computer program product at any possible technical detail level of integration. The computer program product may include a computer-readable storage medium (or media) having computer readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But the various embodiments may be practiced without these specific details. In other instances, well-known circuits, structures, and techniques have not been shown in detail in order not to obscure embodiments.

When different reference numbers comprise a common number followed by differing letters (e.g., 100*a*, 100*b*, 100*c*) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A system for infrastructure discovery and service offering, the system comprising:
    a memory;
    a processor;
    a storage having stored thereon computer executable program code;
    a discovery engine configured to discover applications and configuration information of components deployed in an IT infrastructure of an enterprise including servers and networking devices discovered and providing a reconciliation analysis to remove duplicate discovered components, the discovery engine further configured to generate predictive need analytics, using a machine learning model, based on an analysis of the configuration information, wherein the predictive need analytics indicate a type of infrastructure for the enterprise based on a need discovered by the machine learning model;
    a cloud services engine configured to retrieve cloud-based service offerings from cloud service providers compatible with the components by comparing the applications and the predictive need analytics to cloud-based services and to provide service offerings by examining configurations of the components to determine relationships between the applications and the components; and
    a decision engine configured to generate a decision-making chart based on the predictive need analytics, the components, and the cloud-based service offerings, the decision-making chart providing a migration path for the IT infrastructure by indicating the components and the applications that are migratable to the cloud-based services.

2. The system of claim 1, wherein the discovery engine is further configured to analyze the configuration information on the IT infrastructure and catalog transactional matches between application sets and to notate reconciliation exceptions between the components.

3. The system of claim 1, wherein the cloud services engine is further configured to discover applications operating on the IT infrastructure and to map dependencies between the applications.

4. The system of claim 3, wherein the cloud services engine is further configured to produce a matrix guide indicating the cloud-based services compatible with the applications.

5. The system of claim 1, wherein the decision-making chart includes software consumption metrics of applications operating within the IT infrastructure.

6. A computer-implemented method of infrastructure discovery and service offering, the computer-implemented method comprising:
    discovering configuration information of components on an IT infrastructure of an enterprise including servers and networking devices discovered and providing a reconciliation analysis to remove duplicate discovered components and also including a workload of the components;

analyzing the configuration information and the components to determine predictive need analytics, using a machine learning model, for each of the components wherein the predictive need analytics indicate a type of infrastructure for the enterprise based on a need discovered by the machine learning model;

discovering applications operating within the IT infrastructure;

comparing the applications and predictive need analytics to cloud-based services to detect the cloud-based services compatible with the application and the predictive need analytics;

generating a decision-making chart based on the compatible cloud-based services, wherein the decision-making chart indicates the components and the applications that are migratable to the cloud-based services;

providing service offerings by examining configurations of the components to determine relationships between applications and the components.

7. The computer-implemented method of claim 6, wherein the IT infrastructure includes on-premise infrastructure, containerized infrastructure, and cloud-based infrastructure.

8. The computer-implemented method of claim 6, wherein the workload comprise at least one of a peak processor utilization, a peak memory utilization, on-premise storage capacity, network throughput, and usage patterns.

9. The computer-implemented method of claim 6, wherein the applications include relationships between the applications and the components.

10. The computer-implemented method of claim 6, further comprising: retrieving, prior to comparing, the cloud-based services available from at least one cloud service provider.

11. The computer-implemented method of claim 6, wherein the decision-making chart includes a detailed proposal of how to implement a migration for the applications and the components migratable to the cloud-based services including software consumption metrics.

12. The computer-implemented method of claim 6, further comprising: simulating the components under peak utilization on the cloud-based services;

disregarding the cloud-based services incapable of operating the components under the peak utilization; and ranking the remaining cloud-based services based on their performance during the simulation.

13. A computer program product of infrastructure discovery and service offering, the computer program product comprising:

one or more computer readable storage medium, and program instructions stored on the one or more computer readable storage media, the program instructions comprising:

program instructions to discover configuration information of components on an IT infrastructure of an enterprise including servers and networking devices discovered and providing a reconciliation analysis to remove duplicate discovered components and also including a workload of the components;

program instructions to analyze the configuration information and the components to determine predictive need analytics, using a machine learning model, for each of the components, wherein the predictive need analytics indicate a type of infrastructure for the enterprise based on a need discovered by the machine learning model;

program instructions to discover applications operating within the IT infrastructure;

program instructions to compare the applications and predictive need analytics to cloud-based services to detect the cloud-based services compatible with the application and the predictive need analytics;

program instructions to generate a decision-making chart based on the compatible cloud-based services, wherein the decision-making chart indicates the components and the applications that are migratable to the cloud-based services; and program instructions to provide service offerings by examining configurations of the components to determine relationships between applications and the components.

14. The computer program product of claim 13, wherein the IT infrastructure includes on-premise infrastructure, containerized infrastructure, and cloud-based infrastructure.

15. The computer program product of claim 13, wherein the workload comprises at least one of a peak processor utilization, a peak memory utilization, on-premise storage capacity, network throughput, and usage patterns.

16. The computer program product of claim 13, wherein the applications include relationships between the applications and the components.

17. The computer program product of claim 13, further comprising: program instructions to retrieve, prior to comparing, the cloud-based services available from at least one cloud service provider.

18. The computer program product of claim 13, further comprising:

program instructions to simulate the components under peak utilization on the cloud-based services;

program instructions to disregard the cloud-based services incapable of operating the components under the peak utilization; and program instructions to rank the remaining cloud-based services based on their performance during the simulation.

* * * * *